(12) United States Patent
 Jiang

(10) Patent No.: US 9,094,259 B2
(45) Date of Patent: Jul. 28, 2015

(54) NETWORKING METHOD AND DEVICE VIA NETWORK INTERFACE OF DATA CARD EQUIPMENT

(75) Inventor: Jiewei Jiang, Shenzhen (CN)

(73) Assignee: ZTE Corporation (CN)

( * ) Notice: Subject to any disclaimer, the term of this patent is extended or adjusted under 35 U.S.C. 154(b) by 148 days.

(21) Appl. No.: 13/988,434

(22) PCT Filed: Apr. 14, 2011

(86) PCT No.: PCT/CN2011/072823
§ 371 (c)(1),
(2), (4) Date: May 20, 2013

(87) PCT Pub. No.: WO2012/068819
PCT Pub. Date: May 31, 2012

(65) Prior Publication Data
US 2013/0246647 A1    Sep. 19, 2013

(30) Foreign Application Priority Data
Nov. 22, 2010    (CN) .......................... 2010 1 0553731

(51) Int. Cl.
*G06F 3/00* (2006.01)
*G06F 9/44* (2006.01)
*G06F 9/46* (2006.01)
*G06F 13/00* (2006.01)
*H04L 29/06* (2006.01)
*H04L 29/08* (2006.01)

(52) U.S. Cl.
CPC .......... *H04L 29/06129* (2013.01); *H04L 67/34* (2013.01); *H04L 69/32* (2013.01)

(58) Field of Classification Search
None
See application file for complete search history.

(56) References Cited

U.S. PATENT DOCUMENTS

2009/0222542 A1    9/2009    Miyajima

FOREIGN PATENT DOCUMENTS

| CN | 101075178 | 11/2007 |
| CN | 101702131 | 5/2010 |
| CN | 102025787 | 4/2011 |

OTHER PUBLICATIONS

International Search Report for International Patent Application No. PCT/CN2011/072823, mailed Aug. 25, 2011.

*Primary Examiner* — Craig Dorais
(74) *Attorney, Agent, or Firm* — McAndrews, Held & Malloy, Ltd.

(57) ABSTRACT

The disclosure provides a networking method and device via network interface of data card equipment, wherein the method includes: loading a user application module, a control instruction library and a driver of the data card equipment in a computer configured with a Mac operating system; creating a virtual network interface matched with equipment attributes according to the equipment attributes reported by the data card equipment; sending a control instruction to the control instruction library; the control instruction library preliminarily packing and outputting the control instruction; an upper driver analyzing the data packet that is input by the control instruction library and that contains the control instruction, and encapsulating the control instruction in a communication control protocol format and then forwarding the control instruction; and a lower driver sending the data packet containing the control instruction to the data card equipment via a communication pipe. According to the invention, the problem that the Mac operating system is unable to network via the network interface of data card equipment can be effectively solved, and the rate bottleneck problem caused when the data card networks via a serial port at present also can be solved well.

14 Claims, 5 Drawing Sheets

NETWORKING METHOD AND DEVICE VIA NETWORK INTERFACE OF DATA CARD EQUIPMENT

FIELD OF THE INVENTION

The disclosure relates to the technical field of communications. and in particular to a networking method and device via network interface of data card equipment.

BACKGROUND OF THE INVENTION

With continuous development of information technology, higher requirements are proposed to wireless data terminal equipment. Voice, short message and some additional functions are required more and more, and requirements on the uplink and downlink rate of networking are increasingly proposed, rate is the most important performance index of wireless data card equipment.

There are two ways of networking the wireless data card equipment onto a computer, one is traditional networking by virtual serial port, and the other one is networking by virtual network interface (Ethernet Adaptor). The traditional networking by virtual serial port has been achieved on a plurality of platforms such as Windows, Mac and Linux, but it has bottlenecks in terms of Internet wideband and rate, the uplink and downlink rate could not meet demands of users. In order to improve the rate of the wireless data card equipment, there is a growing tendency to employ the second way. In Windows operating system, networking by virtual network interface has been achieved, while such networking way has not been yet achieved in Mac, Linux and other operating systems, the development of related products is constrained largely. However, among global computer users, Mac users have a large market share, more and more wireless data card equipment are definitely required to be able to support the Mac operating system.

Therefore, it is necessary to provide a networking method or device via network interface of the wireless data card equipment in the Mac operating system.

SUMMARY OF THE INVENTION

Therefore, the disclosure provides a networking method and device via network interface of data card equipment, in order to achieve operations such as data interaction and networking between the Mac operating system and the data card equipment.

To solve the above technical problem, the technical solutions of the disclosure are implemented as follows:

a networking method via network interface of data card equipment comprises the following steps:

loading a user application module, a control instruction library and a driver of the data card equipment in a computer configured with a Mac operating system, wherein the control instruction library provides an Application Programming Interface (API), and the user application module comprises a browser and an instruction sending module;

creating a virtual network interface matched with equipment attributes according to the equipment attributes reported by the data card equipment when the data card equipment is connected with the computer and the driver is loaded successfully;

the user application module sending a control instruction to the control instruction library via the API;

the control instruction library preliminarily packing the control instruction, and outputting the data packet via an IOUserClient class interface in the computer;

an upper driver analyzing the data packet that is input by the control instruction library and that contains the control instruction, and encapsulating the control instruction in a communication control protocol format and then forwarding the control instruction; and a lower driver sending the data packet containing the control instruction to the data card equipment via a communication pipe.

The lower driver sending the data packet containing the control instruction to the data card equipment via a communication pipe comprises: the lower driver sorting the control instruction and data streams, and performing data interaction with the data card equipment via a control pipe and a data streams input/output pipe respectively.

After the lower driver sending the data packet containing the control instruction to the data card equipment via a communication pipe, the method further comprises: after networking, the user application module communicating with the upper driver via a Transfer Control Protocol (TCP)/User Datagram Protocol (UDP) transport layer and network layer in the Mac operating system, and transporting data streams in a network to the upper driver via the network layer; and the upper driver packing and forwarding the data streams in the network to the lower driver.

The method further comprises: displaying a networking control identifier and a data traffic statistics identifier in a User Interface (UI), accepting networking operation of the user, and performing the statistics of data traffic during the data interaction process.

Before creating a virtual network interface matched with equipment attributes according to the equipment attributes reported by the data card equipment when the data card equipment is connected with the computer and the driver is loaded successfully, the method further comprises: judging whether to load a driver according to the equipment attributes reported by the data card equipment; if so, loading the driver for the data card equipment.

A networking device via network interface of data card equipment comprising:

a UI, configured to load a user application module, a control instruction library and a driver of the data card equipment in a computer configured with a Mac operating system;

an upper driver, configured to create a virtual network interface matched with equipment attributes according to the equipment attributes reported by the data card equipment when the data card equipment is connected with the computer and the driver is loaded successfully; further configured to analyze the data packet that is input by the control instruction library and that contains the control instruction, and encapsulate the control instruction in a communication control protocol format and then forward the control instruction;

a user application module, configured to send a control instruction to the control instruction library via an API;

a control instruction library, configured to preliminarily pack the control instruction, and output the data packet via an IOUserClient class interface in the computer; and a lower driver, configured to send the data packet containing the control instruction to the data card equipment via a communication pipe.

The lower driver is further configured to sort the control instruction and data streams, and perform data interaction with the data card equipment via a control pipe and a data streams input/output pipe respectively.

The user application module is further configured to: after networking, communicate with the upper driver via a TCP/UDP transport layer and network layer in the Mac operating system, and transport data streams in a network to the upper driver via the network layer; and the upper driver is further configured to pack and forward the data streams in the network to the lower driver.

The device further comprises: a network processing module, configured to display a networking control identifier and a data traffic statistics identifier in the UI, accept the networking operation of the user, and perform the statistics of data traffic during the data interaction process.

The lower driver is further configured to judge whether to load a driver according to the equipment attributes reported by the data card equipment; if so, load the driver for the data card equipment.

According to the networking method or device via network interface of data card equipment provided in the disclosure, by setting the upper driver and the lower driver and loading the control instruction library, the user application module and the driver of the data card equipment in the Mac operating system, data interaction between the Mac operating system and the data card equipment can be achieved, networking operation can be performed via the data card equipment, the gap in the conventional art is filled. In the disclosure, networking is achieved via the network interface of the data card equipment, compared with the primary networking way by a serial port, the downlink rate is improved greatly, and demands of users can be met better. Besides, due to the separated upper driver and lower driver, the constructed system has high stability, low complexity, good fault tolerance and high function separation degree, which is convenient to add control instructions new functions related to Universal Serial Bus (USB) protocol.

DETAILED DESCRIPTION OF THE EMBODIMENTS

The implementation of purposes, function features and advantages of the disclosure will be further described below with reference to drawings and embodiments. It should be noted that, specific embodiments described here are just used for explaining the disclosure, but not for limiting the disclosure.

Figure 1:
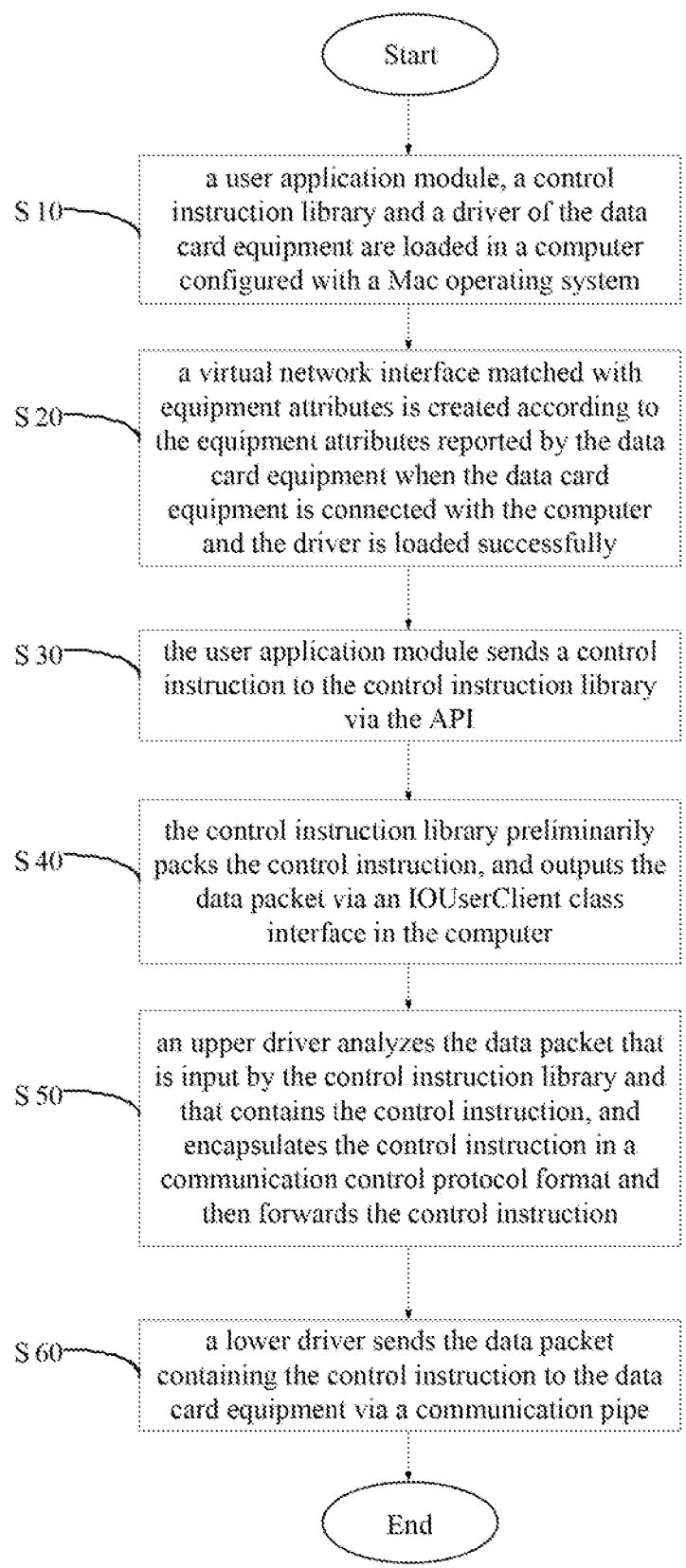
FIG. 1 is a flowchart of a networking method via a network interface of data card equipment according to an embodiment of the disclosure.

FIG. 1 is a flowchart of a networking method via a network interface of data card equipment according to an embodiment of the disclosure, and the method includes the following steps.

S10: a user application module, a control instruction library and a driver of the data card equipment are loaded in a computer configured with a Mac operating system;

the control instruction library may provide an API; the user application module includes a browser and an instruction sending module. The user application module may be a user application program that can send control instructions such as networking, disconnection, statistics of data streams and webpage browsing or the like. Loading a user application program and a database in a computer is well known to those skilled in the field and will not be described again here.

S20: a virtual network interface matched with equipment attributes is created according to the equipment attributes reported by the data card equipment when the data card equipment is connected with the computer and the driver is loaded successfully;

in one embodiment, when the data card equipment is connected with a computer, it can be judged whether a driver needs to be loaded, if so, the driver is loaded for data interaction between the computer and the data card equipment. The virtual network interface may be specifically Ethernet Adaptor and is displayed in the user configurable network.

S30: the user application module sends a control instruction to the control instruction library via the API; the control instruction includes USB protocol communication instruction and QUALCOMM MSM Interface (OMI) instruction; by the USB protocol communication instruction, data interaction between the computer and the data card equipment can be achieved; by the OMI instruction, connection to network can be achieved.

S40: the control instruction library preliminarily packs the control instruction, and outputs the data packet via an IOUserClient class interface in the computer;

the control instruction library may be a function library containing a plurality of control instructions, besides, the control instruction library further may provide an API for the Mac operating system, in order to receive an instruction sent by the user application module, and pack and forward the instruction.

S50: an upper driver analyzes the data packet that is input by the control instruction library and that contains the control instruction, and encapsulates the control instruction in a communication control protocol format and then forwards the control instruction;

the upper driver needs to achieve two aspects of functions: one aspect of inheriting IOUserClient class of the system and being responsible for communicating with User Interface (UI) and processing data streams related to control instructions (for example, the QMI instruction), the other aspect of inheriting IQEthernetController class of the system and processing data streams related to network.

S60 a lower driver sends the data packet containing the control instruction to the data card equipment via a communication pipe;

the lower driver may provide a communication pipe for communication between the upper driver and the data card equipment, in one embodiment, the lower driver may respectively perform data interaction with the data card equipment via a control pipe and a data input/output pipe, in order to achieve the purpose of communication between the computer and the data card equipment.

It should be noted that, in embodiments of the disclosure, the data card equipment may be specifically wireless data card equipment with a network interface by which the wireless data card equipment can be connected to a computer, all control instructions and network data related to the network interface in the Mac operating system are interacted with the data card equipment via this interface.

According to the implementation ways of the disclosure, by setting the upper driver and the lower driver and loading the control instruction library, the user application module and the driver of the data card equipment in the Mac operating system, data interaction between the Mac operating system and the data card equipment can be achieved, networking operation can be performed via the data card equipment, the gap in the conventional art is filled. Furthermore, compared with the primary networking way by a serial port, the downlink rate is greatly improved. The downlink rate of one of high-speed data card equipment can reach 21 Mb/s, the downloading rate of the primary networking method by a serial port can only reach 9.5 Mb/s, under same conditions, when the method provided in the disclosure is used, the downloading rate can reach 19 Mb/s that basically meets the rate requirement of equipment, so that demands of users can be met well.

Figure 2:
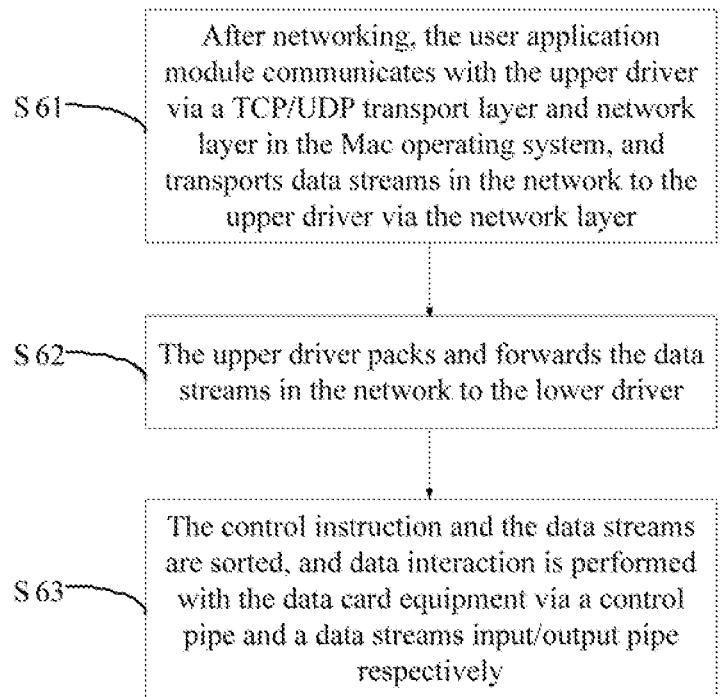
FIG. 2 is a flowchart of data interaction after networking according to another embodiment of the disclosure.

In one embodiment, if the data card equipment has been connected to network via a control instruction, S60 as shown in FIG. 2 may specifically include the following steps.

S61 After networking, the user application module communicates with the upper driver via a TCP/UDP transport layer and network layer in the Mac operating system, and transports data streams in the network to the upper driver via the network layer.

S62: The upper driver packs and forwards the data streams in the network to the lower driver.

S63: The control instruction and the data streams are sorted, and data interaction is performed with the data card equipment via a control pipe and a data streams input/output pipe respectively.

The method flow may further include a step of displaying a networking control identifier and a data traffic statistics identifier in the UI, accepting the networking operation of the user, and performing the statistics of data traffic during the data interaction process. An operable and graphical interface may be provided to the user in the UI, in one embodiment, a network networking control and data statistics function module may be added in the UI to provide networking operation and to obtain statistics information, in order to perform operations, such as parameter setup, state display and networking via the Mac operating system application program or the like.

Besides, the above method flow in the disclosure may further include: by using a power module, a thread module and a data synchronous management module or the like, performing power management for the data card equipment and performing synchronization and thread scheduling management for data streams interacted between the Mac operating system and the data card equipment, wherein power management may include a power-on mode when in normal use and low-power model when in dormant state, or the like.

Figure 3:
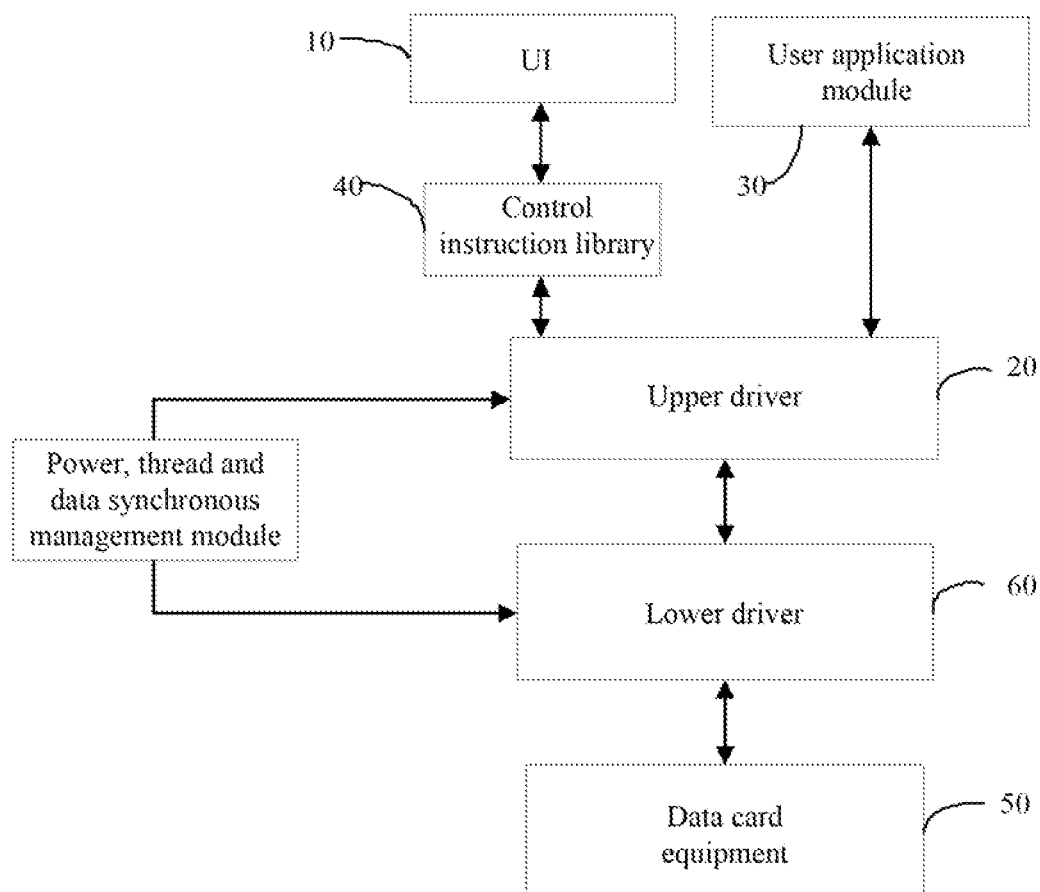
FIG. 3 is a structure diagram of a networking device via a network interface of data card equipment according to an embodiment of the disclosure.

The disclosure provides a networking device via network interface of data card equipment, which can achieve the above method flow. With reference to FIG. 3, the networking device via the network interface of data card equipment includes:

a UI 10, configured to load a user application module 30, a control instruction library 40 and a driver of the data card equipment in a computer configured with a Mac operating system: the control instruction library 40 can provide an API; the user application module 30 includes a browser and an instruction sending module; the user application module 30 specifically may be a user application program that can send control instructions such as networking, disconnection, statistics of data streams and webpage browsing or the like.

Loading a user application program and a database in a computer is well known to those skilled in the field and will not be described again here.

an upper driver 20, configured to create a virtual network interface matched with equipment attributes according to the equipment attributes reported by the data card equipment 50 when the data card equipment 50 is connected with the computer and the driver is loaded successfully; the upper driver 20 is further configured to analyze the data packet that is input by the control instruction library and that contains the control instruction, and encapsulate the control instruction in a communication control protocol format and then forward the control instruction; in one embodiment, when the data card equipment 50 is connected with a computer, it can be judged whether a driver needs to be loaded, if so, the driver is loaded for data interaction between the computer and the data card equipment 50; the virtual network interface may be Ethernet Adaptor and is displayed in the user configurable network.

a user application module 30, configured to send a control instruction to the control instruction library 40 via an API; the control instruction includes USB protocol communication instruction and QMI instruction; by the USB protocol communication instruction, data interaction between the computer and the data card equipment 50 can be achieved; by the QMI instruction, connection to network can be achieved.

a control instruction library 40, configured to preliminarily pack the control instruction, and output the data packet via an IOUserClient class interface in the computer; the control instruction library 40 may be a function library containing a plurality of control instructions and further may provide an API; the user application module 30 includes a browser and an instruction sending module; the control instruction library 40 further may provide an API for the Mac operating system, in order to receive an instruction sent by the user application module 30, and pack and forward the instruction.

a lower driver 60, configured to send the data packet containing the control instruction to the data card equipment 50 via a communication pipe. the lower driver 60 may provide a communication pipe for communication between the upper driver 20 and the data card equipment 50, in one embodiment, the lower driver 60 may respectively perform data interaction with the data card equipment 50 via a control pipe and a data input/output pipe, in order to achieve the purpose of communication between the computer and the data card equipment 50.

In one embodiment, the user application module 30 is further configured to: after networking, communicate with the upper driver via a TCP/UDP transport layer and network layer in the Mac operating system, and transport data streams in the network to the upper driver 20 via the network layer. The upper driver 20 is further configured to pack and forward the data streams in the network to the lower driver 60. The lower driver 60 is further configured to sort the control instruction and the data streams, and perform data interaction with the data card equipment 50 via a control pipe and a data streams input/output pipe respectively.

In one embodiment, the device may further include a network processing module, configured to display a networking control identifier and a data traffic statistics identifier in the UI, accept the networking operation of the user, and perform the statistics of data traffic during the data interaction process. A network processing module may be added in the UI to provide networking operation and to obtain statistics information, in order to perform operations, such as parameter setup, state display and networking via the Mac operating system application program or the like.

Besides, the device may further include a power module, a thread module and a data synchronous management module or the like, to perform power management for the data card equipment and to perform synchronization and thread scheduling management for data streams interacted between the Mac operating system and the data card equipment, wherein power management may include a power-on mode when in normal use and low-power model when in dormant state, or the like.

Figure 4:
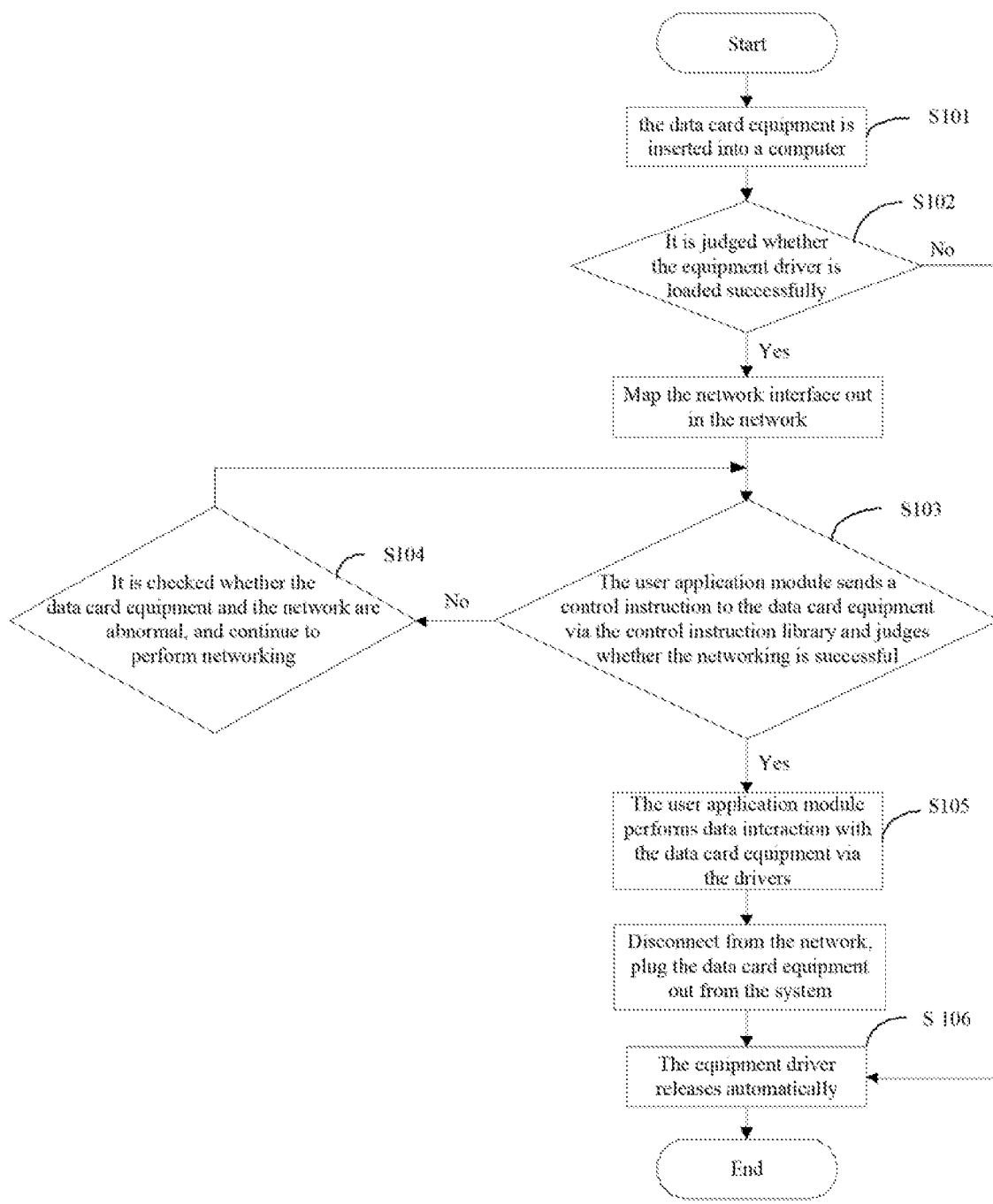
FIG. 4 is a flowchart of networking by a networking device via a network interface of data card equipment according to an embodiment of the disclosure.

With reference to FIG. 4, FIG. 4 is a flowchart of networking operation by a networking device via a network interface of data card equipment according to an embodiment of the disclosure, and the method includes the following steps:

S101: The data card equipment is inserted into a computer; before this step, the network interface driver, function library and user application program have been installed in the computer, when the data card equipment with a network interface function is inserted into the computer which installed with the Mac operating system, the network interface judges whether to load a driver according to the reported equipment attributes, if the network interface driver can be loaded successfully, S102 is executed, if the network interface driver cannot be loaded successfully, S106 is executed.

S102: It is judged whether the equipment driver is loaded successfully; if the equipment driver is loaded successfully, one virtual network interface (Ethernet Adaptor) is created according to the condition reported by the data card equipment and displayed in the user configurable network, simultaneously, S103 is executed; if the equipment driver cannot be loaded successfully, S106 is executed.

S103: The user application module sends a control instruction to the data card equipment via the control instruction library and judges whether the networking is successful; for example, the user application program communicates with the upper driver via the function library, further to access the data card equipment for networking operation, if connection to the network via the control instruction is successful, S105 is executed, if failed, S104 is executed.

S104: It is checked whether the data card equipment and the used network are abnormal, if the abnormality is appropriately configured and repaired, S103 is executed again for networking.

S105: The user application module performs data interaction with the data card equipment via the upper driver and the lower driver, to meet various surfing demands of the user. If the user disconnects from the network or plugs the data card equipment out from the computer, S106 is executed.

S106: The equipment driver releases automatically, and the virtual network interface disappears automatically. So far, the flow ends.

Figure 5:
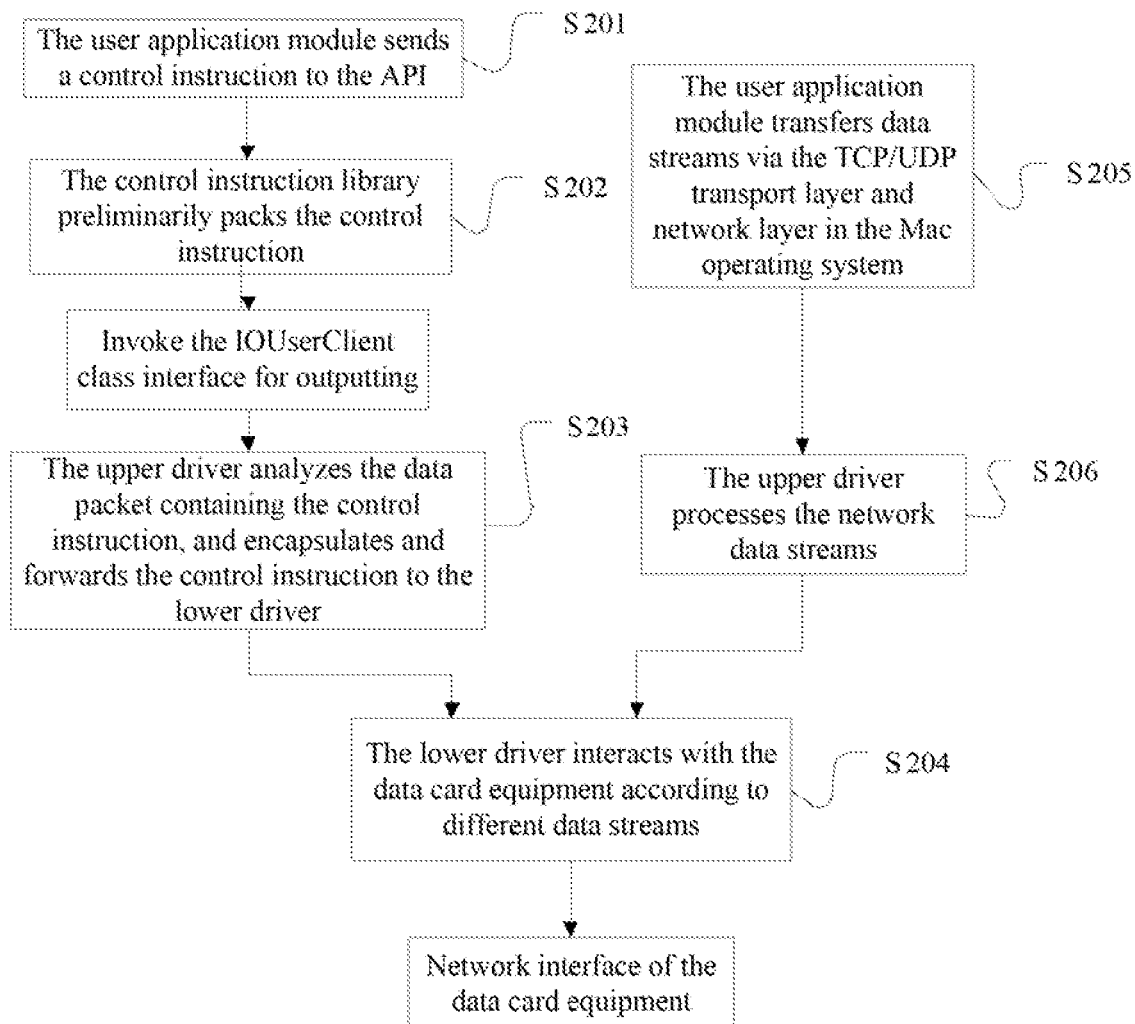
FIG. 5 is a flowchart of data interaction by a networking device via a network interface of data card equipment according to an embodiment of the disclosure.

With reference to FIG. 5, FIG. 5 is a flowchart of data card network interface data interaction by a networking device via a network interface of data card equipment according to an embodiment of the disclosure, arrow in the drawing only shows a flow-out direction that data flows into the data card equipment from the computer, the flow-in direction is contrary to the flow-out direction, it can be understood reversely. The flow includes the following specific steps:

S201: The user application module sends a control instruction to the API; for example, the user application program invokes the API related to the control instruction, for example, the API includes a function interface such as networking and data statistics or the like, and sends a QMI instruction to the control instruction library. S202 is then executed.

S202: The control instruction library preliminarily packs the control instruction; for example, a control instruction interacted with the data card equipment enters the function library, and the function library preliminarily packs the instruction to be interacted, and invokes the system IOKitlib interface to access the upper driver. S203 is then executed.

S203: The upper driver analyzes the data packet containing the control instruction, and encapsulates and forwards the control instruction to the lower driver; one part of the upper driver inherits IOUserClient class, receives data coming from the control instruction function library, encapsulates data in a control protocol format, and continuously sends the data to the lower driver. S204 is then executed.

S204: The lower driver sorts data from the upper driver into control instructions and network data streams, and performs data interaction with the data card equipment via a control pipe and a input/output pipe respectively, in order to achieve the purpose of communication between the computer and the data card equipment. If the data card equipment has been connected to the network via the control instruction, S205 is then executed.

S205: The user application module transfers data streams via the TCP/UDP transport layer and network layer in the Mac operating system; the user application program in the system, for example, browser, communicates with the upper driver via the TCP/UDP transport layer and network layer in the Mac OS. S206 is then executed.

S206: The upper driver processes the network data streams. For network-related data streams from the network layer, one part of the upper driver inherits IOEthernetController class, is responsible for processing network-related data streams, and packs and submits data to the lower driver for processing. S204 is then executed.

The above contents just describe preferred embodiments of the disclosure and are not intended to limit the patent scope of the disclosure. Any equivalent structures or equivalent flow transformations made by using contents in the specification and drawings of the disclosure, or direct or indirect applications in other related technical fields should be included within the patent protection scope of the disclosure.

What is claimed is:

1. A networking method via network interface of data card equipment, comprising the following steps:
    loading a user application module, a control instruction library and a driver of the data card equipment in a computer configured with an operating system, wherein the control instruction library provides an Application Programming Interface (API), and the user application module comprises a browser and an instruction sending module;
    creating a virtual network interface matched with equipment attributes according to the equipment attributes reported by the data card equipment when the data card equipment is connected with the computer and the driver is loaded successfully;
    the user application module sending a control instruction to the control instruction library via the API;
    the control instruction library preliminarily packing the control instruction, and outputting data packets via an IOUserClient class interface in the computer;
    an upper driver analyzing the data packets that is input by the control instruction library and that contains the control instruction, and encapsulating the control instruction in a communication control protocol format and then forwarding the control instruction; and
    a lower driver sending the data packets containing the control instruction to the data card equipment via a communication pipe.

2. The networking method via network interface of data card equipment according to claim 1, wherein the lower driver sending the data packets containing the control instruction to the data card equipment via a communication pipe comprises:

the lower driver sorting the control instruction and data streams, and performing data interaction process with the data card equipment via a control pipe and a data streams input/output pipe respectively.

3. The networking method via network interface of data card equipment according to claim 2, wherein after the lower driver sending the data packets containing the control instruction to the data card equipment via a communication pipe, the method further comprises:

after networking, the user application module communicating with the upper driver via a Transfer Control Protocol (TCP)/User Datagram Protocol (UDP) transport layer and network layer in the operating system, and transporting data streams in a network to the upper driver via the network layer; and the upper driver packing and forwarding the data streams in the network to the lower driver.

4. The networking method via network interface of data card equipment according to claim 1, wherein the method further comprises:

displaying a networking control identifier and a data traffic statistics identifier in a User Interface (UI), accepting networking operation of the user, and performing the statistics of data traffic during data interaction process.

5. The networking method via network interface of data card equipment according to claim 4, wherein before creating the virtual network interface matched with the equipment attributes according to the equipment attributes reported by the data card equipment when the data card equipment is connected with the computer and the driver is loaded successfully, the method further comprises:

judging whether to load a driver according to the equipment attributes reported by the data card equipment; if so, loading the driver for the data card equipment.

6. A networking device via network interface of data card equipment, comprising a hardware processor, configured to perform the function of a User Interface (UI), an upper driver, a user application module, a control instruction library, and a lower driver, wherein:

the User Interface (UI) is configured to load the user application module, the control instruction library and a driver of the data card equipment in a computer configured with an operating system;

the upper driver is configured to create a virtual network interface matched with equipment attributes according to the equipment attributes reported by the data card equipment when the data card equipment is connected with the computer and the driver is loaded successfully; further configured to analyze data packets that is input by the control instruction library and that contains the control instruction, and encapsulate the control instruction in a communication control protocol format and then forward the control instruction;

the user application module is configured to send a control instruction to the control instruction library via an Application Programming Interface (API);

the control instruction library is configured to preliminarily pack the control instruction, and output the data packets via an IOUserClient class interface in the computer; and the lower driver is configured to send the data packets containing the control instruction to the data card equipment via a communication pipe.

7. The networking device via network interface of data card equipment according to claim 6, wherein the lower driver is further configured to sort the control instruction and data streams, and perform data interaction process with the data card equipment via a control pipe and a data streams input/output pipe respectively.

8. The networking device via network interface of data card equipment according to claim 7, wherein the user application module is further configured to: after networking, communicate with the upper driver via a Transfer Control Protocol (TCP)/ User Datagram Protocol (UDP) transport layer and network layer in the operating system, and transport data streams in a network to the upper driver via the network layer; and the upper driver is further configured to pack and forward the data streams in the network to the lower driver.

9. The networking device via network interface of data card equipment according to claim 6, wherein the hardware processor of the device is further configured to perform the function of a network processing module, wherein:

the network processing module is configured to display a networking control identifier and a data traffic statistics identifier in the UI, accept the networking operation of the user, and perform the statistics of data traffic during data interaction process.

10. The networking device via network interface of data card equipment according to claim 9, wherein the lower driver is further configured to judge whether to load a driver according to the equipment attributes reported by the data card equipment; if so, load the driver for the data card equipment.

11. The networking method via network interface of data card equipment according to claim 2, wherein the method further comprises:

displaying a networking control identifier and a data traffic statistics identifier in a User Interface (UI), accepting networking operation of the user, and performing the statistics of data traffic during the data interaction process.

12. The networking method via network interface of data card equipment according to claim 3, wherein the method further comprises:

displaying a networking control identifier and a data traffic statistics identifier in a User Interface (UI), accepting networking operation of the user, and performing the statistics of data traffic during the data interaction process.

13. The networking device via network interface of data card equipment according to claim 7, wherein the hardware processor of the device is further configured to perform the function of a network processing module, wherein:

the network processing module is configured to display a networking control identifier and a data traffic statistics identifier in the UI, accept the networking operation of the user, and perform the statistics of data traffic during the data interaction process.

14. The networking device via network interface of data card equipment according to claim 8, wherein the hardware processor of the device is further configured to perform the function of a network processing module, wherein:

the network processing module is configured to display a networking control identifier and a data traffic statistics identifier in the UI, accept the networking operation of the user, and perform the statistics of data traffic during the data interaction process.

* * * * *